United States Patent
John et al.

(10) Patent No.: US 9,057,327 B2
(45) Date of Patent: Jun. 16, 2015

(54) METHOD AND APPARATUS FOR HEATING LIQUID FUEL SUPPLIED TO A GAS TURBINE COMBUSTOR

(75) Inventors: Joseph John, Karnataka (IN); Manikandan Thiyagarajan, Karnataka (IN); Indrajit Mazumdar, Karnataka (IN); Awanish Kumar, Karnataka (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 444 days.

(21) Appl. No.: 13/603,953

(22) Filed: Sep. 5, 2012

(65) Prior Publication Data

US 2014/0060057 A1    Mar. 6, 2014

(51) Int. Cl.
*F02C 7/141* (2006.01)
*F02C 7/224* (2006.01)

(52) U.S. Cl.
CPC .............. *F02C 7/141* (2013.01); *F02C 7/224* (2013.01)

(58) Field of Classification Search
CPC .............. F02C 7/22; F02C 7/224; F02C 6/08; F02C 9/18; F02C 7/141; F23R 3/005; F23R 3/28
See application file for complete search history.

(56) References Cited

U.S. PATENT DOCUMENTS

| | | | | |
|---|---|---|---|---|
| 2,925,712 A * | 2/1960 | London et al. | | 60/785 |
| 3,049,878 A * | 8/1962 | Goodall et al. | | 60/785 |
| 3,876,363 A * | 4/1975 | La Haye et al. | | 431/11 |
| 4,404,793 A * | 9/1983 | Coffinberry | | 60/785 |
| 4,550,561 A * | 11/1985 | Coffinberry | | 60/782 |
| 5,255,505 A * | 10/1993 | Cloyd et al. | | 60/806 |
| 5,724,806 A * | 3/1998 | Horner | | 60/785 |
| 6,145,294 A | 11/2000 | Traver et al. | | |
| 6,145,318 A * | 11/2000 | Kaplan et al. | | 60/728 |
| 6,253,554 B1 * | 7/2001 | Kobayashi et al. | | 60/736 |
| 6,438,963 B1 * | 8/2002 | Traver et al. | | 60/779 |
| 6,499,302 B1 | 12/2002 | Ranasinghe | | |
| 2008/0229751 A1 * | 9/2008 | Orlando et al. | | 60/736 |
| 2009/0260342 A1 * | 10/2009 | Ishiguro et al. | | 60/39.511 |
| 2012/0096869 A1 * | 4/2012 | Kesseli et al. | | 60/772 |

FOREIGN PATENT DOCUMENTS

JP      S54130717 A  *  10/1979  ............... F02C 7/22

* cited by examiner

*Primary Examiner* — Gerald L Sung
*Assistant Examiner* — Scott Walthour
(74) *Attorney, Agent, or Firm* — Nixon & Vanderhye, P.C

(57) ABSTRACT

A method of heating liquid fuel upstream of a combustor in a system where compressor discharge air is cooled before being supplied to fuel nozzles in the combustor includes the steps of passing the compressor discharge air through a heat exchanger in heat exchange relationship with the liquid fuel to heat the liquid fuel and cool the compressor discharge air; supplying the heated liquid fuel and the cooled compressor discharge air to the combustor.

17 Claims, 4 Drawing Sheets

METHOD AND APPARATUS FOR HEATING LIQUID FUEL SUPPLIED TO A GAS TURBINE COMBUSTOR

FIELD OF THE INVENTION

The present invention relates generally to gas turbine combustor fuel and air supply systems.

BACKGROUND OF THE INVENTION

Certain gas turbine machines run on crude liquid fuel and in order to maintain the desired viscosity, the liquid fuel must be heated to the appropriate temperature, e.g., about 180°-210° F. Current systems utilize electric heaters that may consume about 250-600 kW of auxiliary power, and, as a practical matter, to provide the required redundancy, such electric heaters are typically required to have a capability of twice their anticipated output.

Gas turbines that operate on crude liquid fuel (e.g., crude oil) also typically supply atomized compressor discharge air to the individual combustors. To effectively use the compressor discharge air, the air must first be cooled to a temperature of about 220° F. Currently, a separate atomizing air cooler using water as the heat exchange medium is used to cool the compressor discharge air.

It would be desirable to develop a liquid fuel system and an atomizing air system that eliminates at least the liquid fuel electric heater if not both the electric heater and the atomizing air cooler so as to reduce auxiliary load consumption and thus reduce costs and improve overall efficiency.

BRIEF DESCRIPTION OF THE INVENTION

According to a first exemplary but nonlimiting embodiment of the invention, there is provided a method of heating liquid fuel upstream of a combustor in a system where compressor discharge air is cooled and then compressed before being supplied to the combustor, the method comprising passing the compressor discharge air in heat exchange relationship with the liquid fuel in a heat exchanger in a liquid fuel supply circuit to heat the liquid fuel; and supplying the heated liquid fuel to the combustor.

According to another exemplary embodiment, there is provided a method of heating liquid fuel upstream of a combustor in a system where compressor discharge air is cooled and compressed before being supplied to fuel nozzles in the combustor, the method comprising (a) supplying a fraction of the compressor discharge air to pass in heat exchange relationship with liquid fuel in a storage tank to thereby increase the liquid fuel temperature; (b) simultaneously, supplying a portion of the fraction of the compressor discharge air to a liquid fuel heat exchanger downstream of the storage tank to further heat the liquid fuel; and (c) supplying reduced temperature compressor discharge air entering the storage tank and the liquid fuel heat exchanger directly to a compressor discharge air moisture separator.

In still another exemplary embodiment, there is provided a combined fuel heating system and atomizing air system for supplying fuel and air to a gas turbine combustor comprising: a heat exchanger in the liquid fuel heating system, the heat exchanger having an inlet arranged to receive relatively warmer compressor discharge air for increasing temperature of the liquid fuel upstream of the combustor, and an outlet arranged to supply reduced temperature compressor discharge air to the atomizing air compressor upstream of the gas turbine combustor.

The invention will now be described in more detail in connection with the drawings identified below.

DETAILED DESCRIPTION OF THE INVENTION

Figure 1:
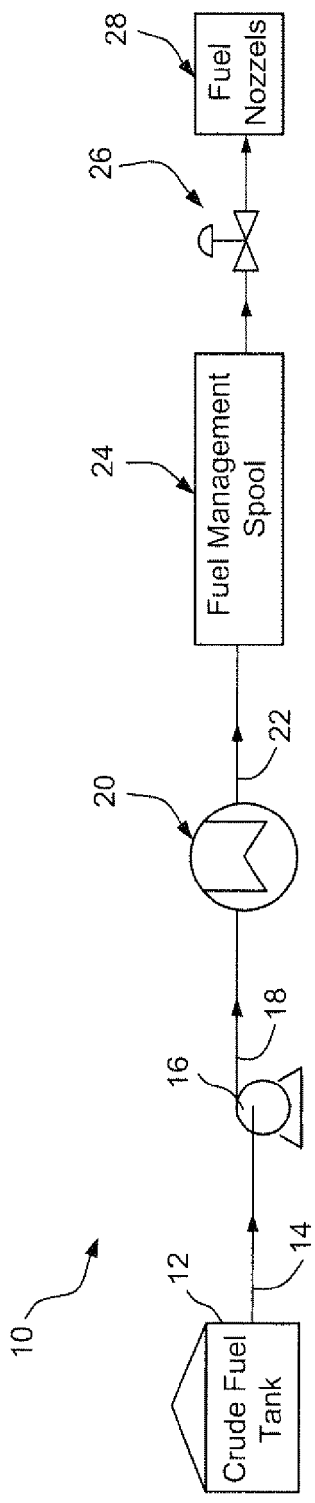
FIG. 1 is a schematic diagram of a liquid fuel system for a turbine combustor.

FIG. 1 discloses a known liquid fuel system 30 for a turbine combustor where an electric heater is used to heat crude liquid (oil) fuel prior to introduction into the turbine combustor fuel nozzles. More specifically, a liquid fuel tank 12 supplies crude liquid fuel via pipe 14 to a forwarding pump 16 which supplies the liquid fuel via pipe 18 to an electric heater 20. Heated liquid fuel is then supplied via pipe 22 to a fuel management spool 24 which, in turn, supplies the fuel, via control valve 26, to the turbine combustor fuel nozzles 28. In this known system, the crude liquid fuel enters the electric heater 20 at a temperature of, for example, about 80° F. and exits the heater at a temperature of, for example about 180° F. As mentioned above, the utilization of an electric heater to heat the fuel is expensive, inefficient and requires excessive auxiliary power.

Figure 2:
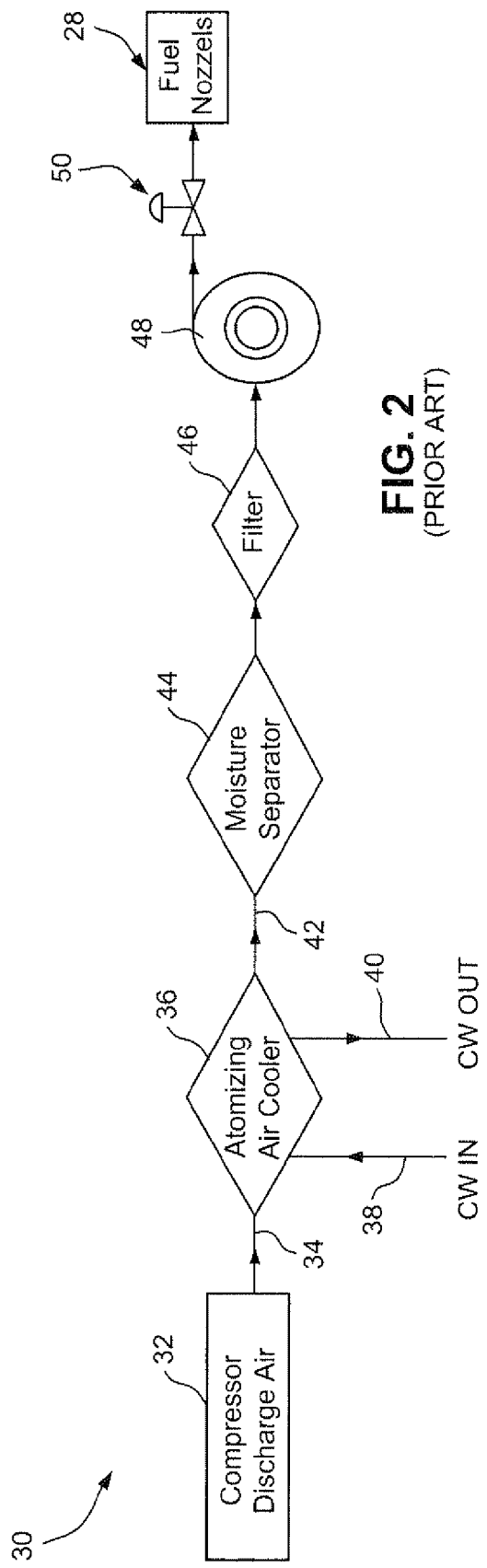
FIG. 2 is a schematic diagram of an atomizing air system for a turbine combustor.

FIG. 2 discloses a known atomizing air system 30 that is used in parallel with the liquid fuel heating system of FIG. 1. The atomizing air system 30 includes an arrangement where the compressor discharge air 32 is supplied via pipe 34 to an atomizing air cooler 36. To cool the compressor discharge air, cold water is supplied to the air cooler 36 via line 38 and exits the air cooler via line 40. In this atomizing air system, the compressor discharge air enters the atomizing air cooler at a temperature of, for example, about 700° F. and, after heat exchange with the cooling water, exits the air cooler at a temperature of, for example, about 225° F. The cooled compressor discharge air is then supplied via pipe to a moisture separator 44, filter 46, and an atomizing air compressor 48. The compressed atomizing air is then supplied to the turbine combustor fuel nozzles 28 via a control valve 50 for atomizing and mixing with the fuel. It will be appreciated that control valves 26, 50 are synchronized and controlled by the main turbine controller, not shown.

Figure 3:
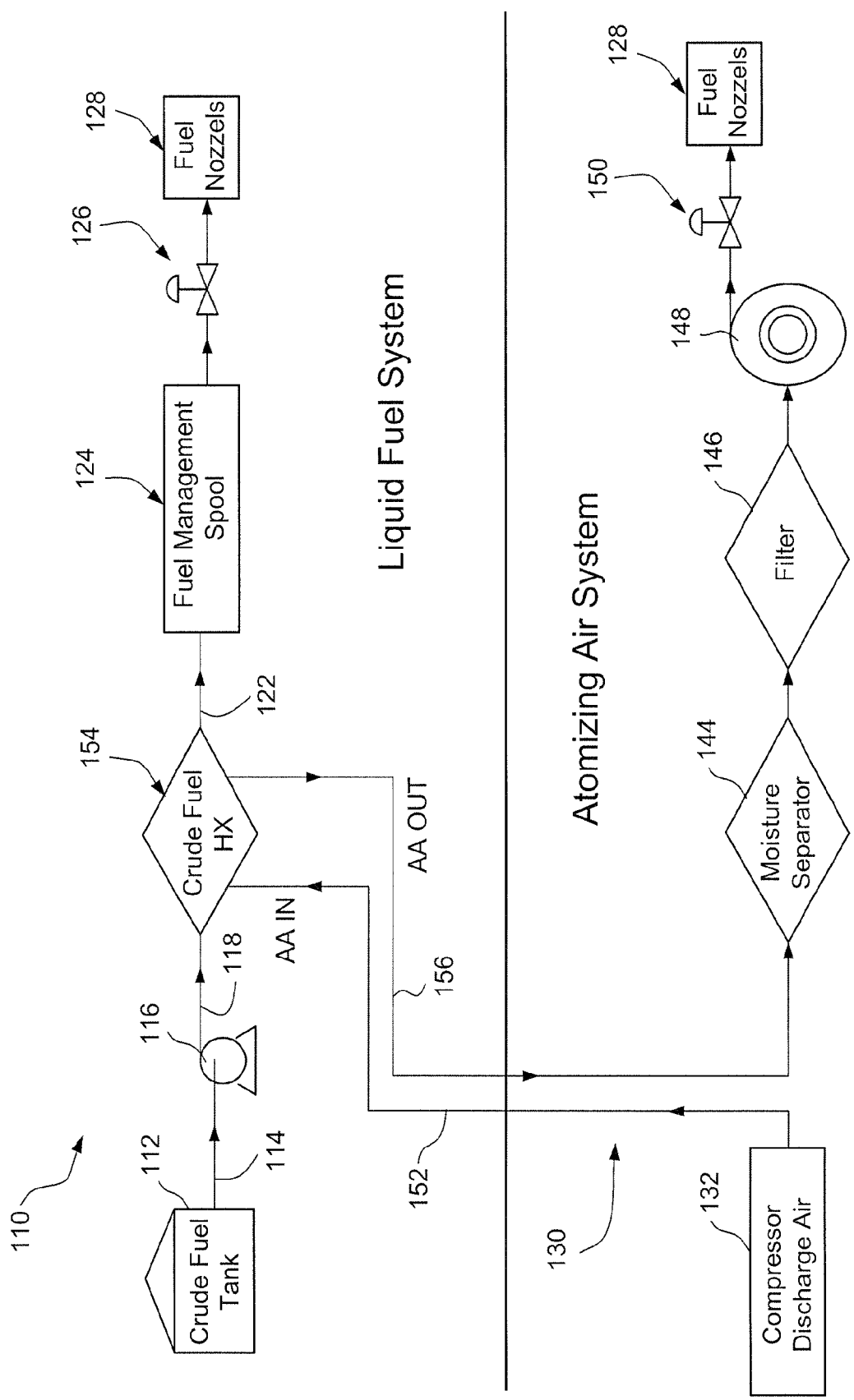
FIG. 3 is a schematic diagram of a combined liquid fuel/atomizing air system in accordance with a first exemplary but nonlimiting embodiment.

FIG. 3 illustrates a first exemplary but nonlimiting embodiment of the invention wherein an atomizing air system 130 is integrated into a fuel heating system 110 so as to eliminate the need for the electric fuel heater 20 (FIG. 1). Specifically, and noting that the same reference numerals as used in FIGS. 1 and 2, but with the prefix "1" added, are used in FIG. 3 to indicate corresponding components. The modified fuel system 110 again utilizes a liquid fuel tank 112, supplying crude liquid fuel to the forwarding pump 116 via pipe 114 and then to a liquid fuel heat exchanger 154. In this exemplary but nonlimiting embodiment, the compressor discharge air 132 is supplied via pipe 152 to the liquid fuel heat exchanger 154 where it passes in heat exchange relationship with the fuel.

Cooled compressor discharge air exits the liquid fuel heat exchanger 154 and is supplied via pipe 156 to the moisture separator 144. The cooled compressor discharge air is then supplied to the filter 146, atomizing air compressor 148, and the fuel nozzles 128 via control valve 150 where it is used as atomizing air as in the previously described embodiment.

Note that in this exemplary but nonlimiting example, compressor discharge air at, for example, about 700° F. is supplied to the liquid fuel heat exchanger 154 via pipe 152 and exits the heat exchanger 154 via pipe 156. The temperature of the compressor discharge air is reduced in the liquid fuel heat exchanger to, for example, about 225° F. which is approximately the same temperature as the compressor discharge air that exits the atomizing air cooler 36 in FIG. 2. Thus, by heating the liquid fuel in the heat exchanger 154 with compressor discharge air, the atomizing air cooler 36 can be eliminated. At the same time, the liquid fuel has been heated from, for example, about 80° F. to, for example about 180° F. without the need for an electric heater, prior to its introduction into the fuel management spool 124.

In other words, this particular embodiment has the advantage of eliminating both the expensive electric heater 20 as well as the atomizing air cooler 36 with substantially no change in the temperature of the fuel entering the fuel management spool 124 or the compressor discharge air entering the moisture separator 144.

Figure 4:
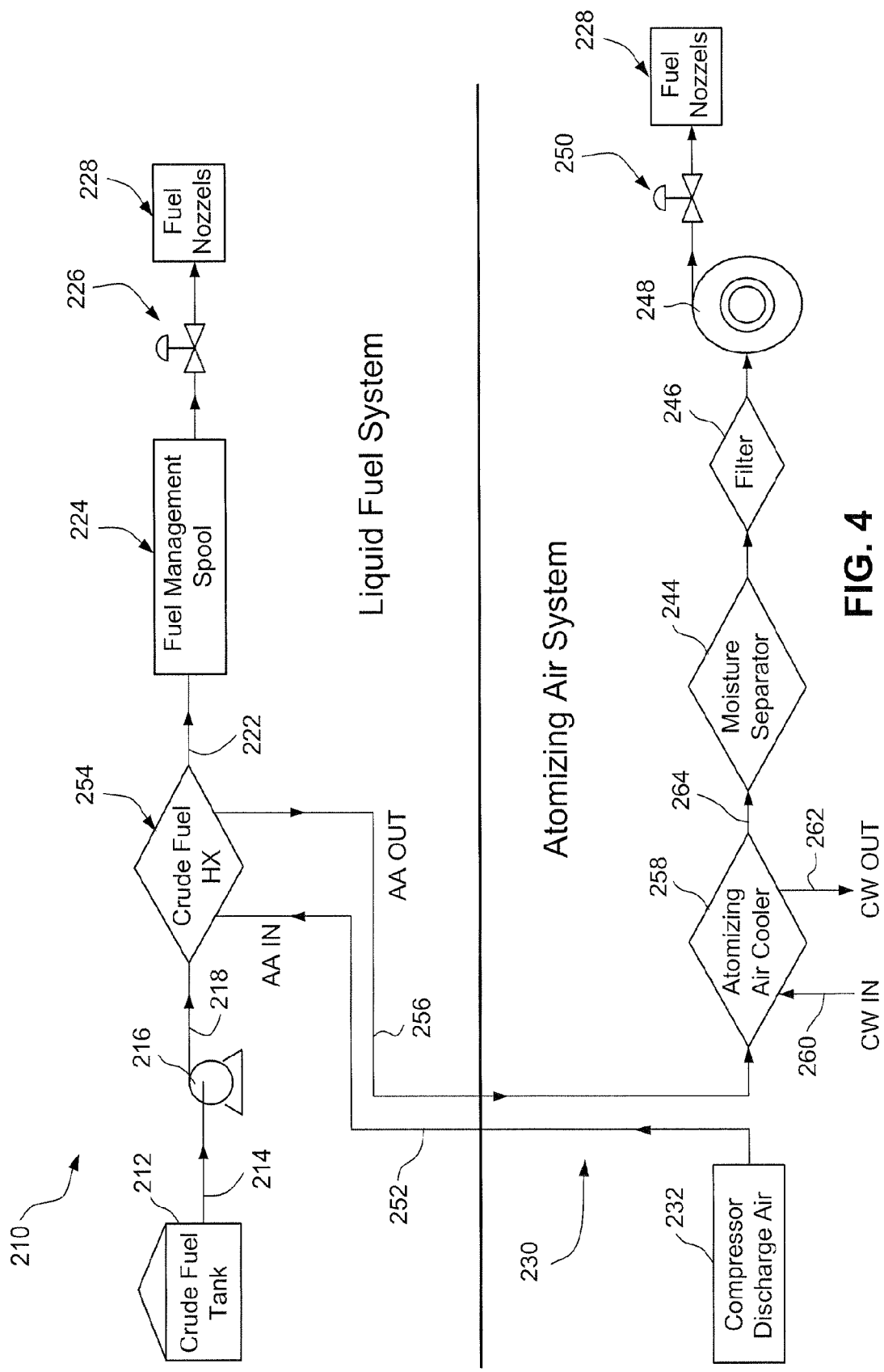
FIG. 4 is a schematic diagram of a combined liquid fuel/atomizing air system in accordance with a second exemplary but nonlimiting embodiment.

A second exemplary but nonlimiting embodiment is illustrated in FIG. 4 where the electric fuel heater 20 is again replaced by a liquid fuel heat exchanger 254. In this second embodiment, however, compressor discharge air is supplied to the liquid fuel heat exchanger 254 via pipe 252 at approximately 700° F. After heat exchange with the liquid fuel, the compressor discharge air exits the liquid fuel heat exchanger 254 at, for example, about 300° F. and is supplied via pipe 256 to the atomizing air cooler 258. In this second exemplary embodiment, the atomizing air cooler 258 is retained in light of the higher temperature of the compressor discharge air exiting the liquid fuel heat exchanger 254. With cold water entering the atomizing air cooler 258 via pipe 260 and exiting line via pipe 262, the compressor discharge air temperature can be reduced from about 300° F. to about 225° F. before it enters the moisture separator 244 via pipe 264. At this point, the compressor discharge air continues through the filter 246, atomizing air compressor 248, and control valve 250 to the turbine combustor fuel nozzles 228. As described above, the liquid fuel exits the heat exchanger 254 via pipe 222 at a temperature of approximately 180° F., and then enters the fuel management spool 224 before being forwarded to the turbine combustor fuel nozzles 228 via control valve 226.

Thus, in this second exemplary embodiment, the electric fuel heater is eliminated but the atomizing air cooler 236 is retained in light of the higher outlet temperature of the compressor discharge air exiting the liquid fuel heat exchanger 254.

Figure 5:
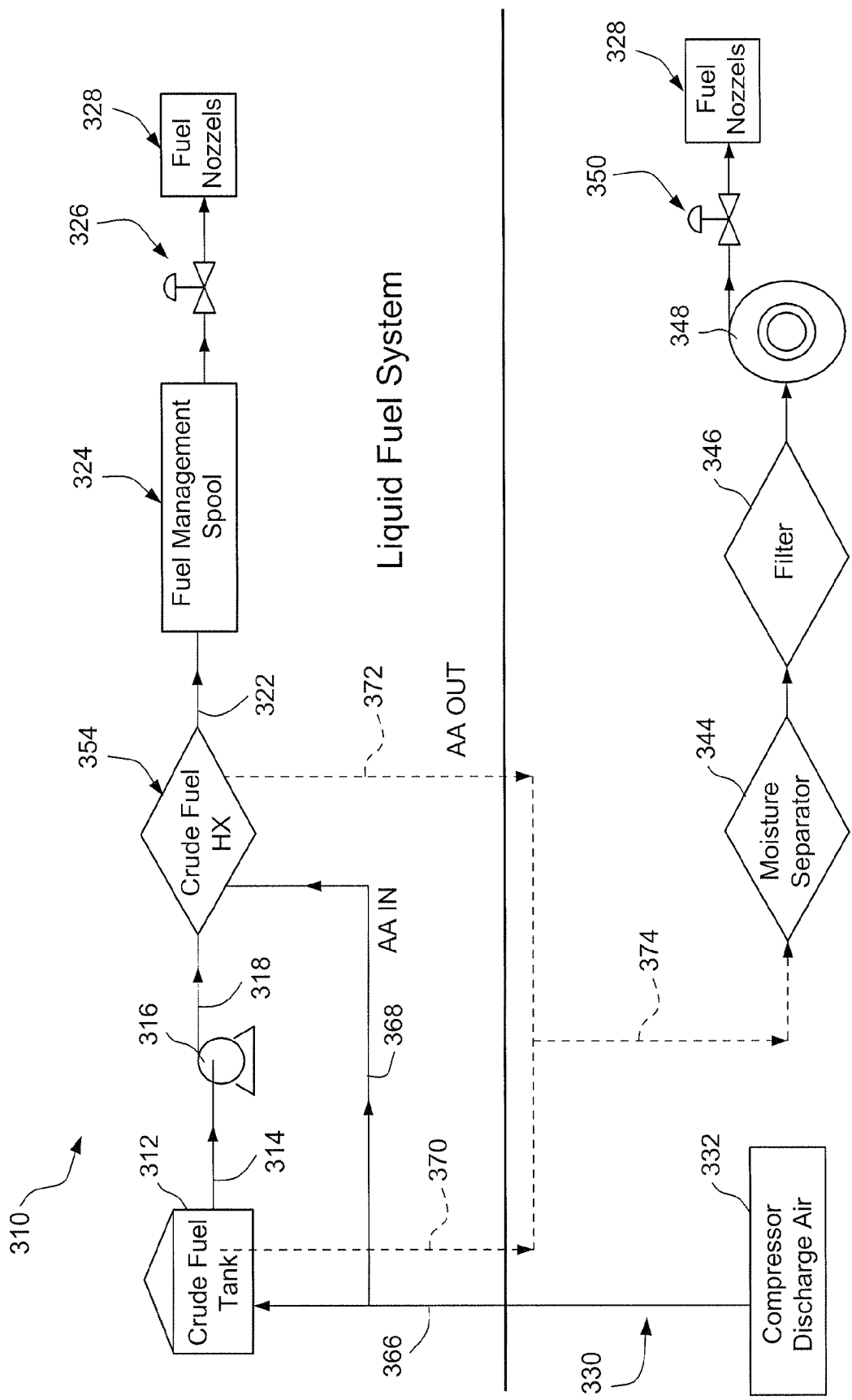
FIG. 5 is a schematic diagram of a combined liquid fuel/atomizing air system in accordance with a third exemplary but nonlimiting embodiment.

A third exemplary but nonlimiting embodiment is illustrated in FIG. 5. Here again, the components of the system remain generally as described in the embodiment illustrated in FIG. 3. In this exemplary but nonlimiting embodiment, however, compressor discharge air 332 is forwarded to pass in heat exchange relationship with the liquid fuel in storage tank 312 at a temperature of about 700° F. A fraction of the compressor discharge air 332 is diverted from pipe 366 and passes in heat exchange relationship with the liquid fuel in the heat exchanger 354 via pipe 368. Compressor discharge air exits the storage tank 312 via pipe 370 at a temperature of about 200° F., and the fraction of the compressor discharge air exits the heat exchanger 354 at a temperature of about 300° F. The compressor discharge air in pipes 370, 372, is merged into a single stream in pipe 374 which supplies the cooled, compressor discharge air to the moisture separator 344 at a temperature at about 225° F. The compressor discharge air is then supplied as in the previously-described embodiments to the filter 346, atomizing air compressor 348 and turbine combustor fuel nozzles 328 via control valve 350.

At the same time, the liquid fuel exits the liquid fuel heat exchanger 354 at a temperature of about 180° F. and is supplied to the fuel management spool 324, and the turbine combustor fuel nozzles 328 via control valve 326.

In each of the three-described embodiments, the conventional liquid fuel electric heater 20 is eliminated in favor of a more efficient and less-costly heat exchanger 154, 254 or 354 integrated with the atomizing air circuit or system, while in two of the three described embodiments, the atomizing air cooler 36 is also eliminated.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of heating liquid fuel upstream of a combustor in a system where compressor discharge air is cooled before being supplied to the combustor, the method comprising:
    (a) applying heat from the compressor discharge air to the liquid fuel in a heat exchanger in a liquid fuel supply circuit as the liquid fuel passes through the heat exchanger;
    (b) supplying the heated liquid fuel to the combustor; and
    (c) supplying compressor discharge air exiting the heat exchanger directly to an atomizing air cooler upstream of a moisture separator in a compressor discharge atomizing air system.

2. The method of claim 1 wherein compressor discharge air enters the heat exchanger at a temperature of about 700° F. and exits the heat exchanger at a temperature of about 225° F.

3. The method of claim 1 wherein liquid fuel enters the heat exchanger at a temperature of about 80° F. and exits the heat exchanger at a temperature of about 180° F.

4. The method of claim 2 wherein liquid fuel enters the heat exchanger at a temperature of about 80° F. and exits the heat exchanger at a temperature of about 180° F.

5. The method of claim 1 wherein, in step (b), the heated fuel is supplied to a fuel management spool upstream of the combustor.

6. The method of claim 1 and further comprising:
    after passing through the heat exchanger, the compressor discharge air is passed through the moisture separator, a filter and a compressor upstream of a plurality of turbine combustor fuel nozzles.

7. The method of claim 5 and further comprising:
    after passing through the heat exchanger, the compressor discharge air is passed through the moisture separator, a filter and a compressor upstream of a plurality of turbine combustor fuel nozzles.

8. A method of heating liquid fuel upstream of a combustor in a system where compressor discharge air is cooled before being supplied to fuel nozzles in the combustor, the method comprising:
    (a) supplying a first portion of a fraction of the compressor discharge air to pass in heat exchange relationship with liquid fuel in a storage tank to thereby increase a temperature of the liquid fuel;

(b) simultaneously supplying a second portion of said fraction of the compressor discharge air to a liquid fuel heat exchanger downstream of said storage tank to further heat said liquid fuel; and (c) supplying reduced temperature compressor discharge air exiting said storage tank and said liquid fuel heat exchanger directly to a compressor discharge air moisture separator.

9. The method of claim 8 wherein compressor discharge air enters the heat exchanger at a temperature of about 700° F. and exits the heat exchanger at a temperature of about 225° F.

10. The method of claim 8 wherein liquid fuel enters the heat exchanger at a temperature of about 80° F. and exits the heat exchanger at a temperature of about 180° F.

11. The method of claim 9 wherein liquid fuel enters the heat exchanger at a temperature of about 80° F. and exits the heat exchanger at a temperature of about 180° F.

12. The method of claim 8 wherein, in step (b), the heated fuel is supplied to a fuel management spool upstream of the combustor.

13. The method of claim 8 wherein, in step (c), the cooled compressor discharge air, after passing through the heat exchanger, is passed through the moisture separator, a filter and a compressor upstream of the fuel nozzles.

14. A combined fuel heating system and atomizing air system for supplying liquid fuel and air to a gas turbine combustor, the gas turbine combustor, and the combined fuel heating system and atomizing air system comprising:

a heat exchanger in the fuel heating system, said heat exchanger having an inlet arranged to receive relatively warm compressor discharge air for increasing a temperature of the liquid fuel upstream of the combustor, and an outlet arranged to supply reduced temperature compressor discharge air to the atomizing air system upstream of the gas turbine combustor;

wherein compressor discharge air exiting the heat exchanger is routed to an atomizing air cooler.

15. The combined fuel heating system and atomizing air system of claim 14 wherein compressor discharge air exiting the heat exchanger is routed directly to a moisture separator.

16. The combined fuel heating system and atomizing air system of claim 14 including a fuel management spool downstream of the heat exchanger and a control valve for admitting liquid fuel to one or more fuel nozzles in the gas turbine combustor.

17. The combined fuel heating system and atomizing air system of claim 15 including an atomizing air compressor downstream of the moisture separator and upstream of the gas turbine combustor.

* * * * *

UNITED STATES PATENT AND TRADEMARK OFFICE
CERTIFICATE OF CORRECTION

PATENT NO.         : 9,057,327 B2
APPLICATION NO.    : 13/603953
DATED              : June 16, 2015
INVENTOR(S)        : Joseph John et al.

It is certified that error appears in the above-identified patent and that said Letters Patent is hereby corrected as shown below:

IN THE SPECIFICATION

At Column 2, line 22, reads -- discloses a known liquid fuel system 30 for a turbine --, should read "discloses a known liquid fuel system 10 for a turbine"

At Column 2, line 44, reads -- compressor discharge air enters the atomizing air cooler at a --, should read "compressor discharge air enters the atomizing air cooler 36 at a"

At Column 2, line 48, reads -- compressor discharge air is then supplied via pipe to a moisture --, should read "compressor discharge air is then supplied via pipe 42 to a moisture"

Signed and Sealed this
Sixth Day of October, 2015

Michelle K. Lee
*Director of the United States Patent and Trademark Office*